United States Patent
Tobias et al.

(10) Patent No.: US 6,560,659 B1
(45) Date of Patent: *May 6, 2003

(54) UNICODE-BASED DRIVERS, DEVICE CONFIGURATION INTERFACE AND METHODOLOGY FOR CONFIGURING SIMILAR BUT POTENTIALLY INCOMPATIBLE PERIPHERAL DEVICES

(75) Inventors: David F. Tobias, Pflugerville, TX (US); Gary M. Godfrey, Austin, TX (US)

(73) Assignee: Advanced Micro Devices, Inc., Sunnyvale, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/383,480

(22) Filed: Aug. 26, 1999

(51) Int. Cl.[7] ................................................. G06F 3/00
(52) U.S. Cl. ................................ 710/8; 710/10; 710/63
(58) Field of Search ............................... 710/8, 63, 10, 710/14, 130, 104

(56) References Cited

U.S. PATENT DOCUMENTS

| | | | | |
|---|---|---|---|---|
| 5,604,843 A | * | 2/1997 | Shaw et al. | 358/1.1 |
| 5,604,904 A | * | 2/1997 | Kini | 709/318 |
| 6,230,118 B1 | * | 5/2001 | Bader et al. | 703/24 |
| 6,269,481 B1 | * | 7/2001 | Perlman et al. | 707/100 |
| 6,301,252 B1 | * | 10/2001 | Rangachar | 370/395.2 |

OTHER PUBLICATIONS

*Platform Solutions: ACPI*, Phoenix Technologies Ltd., http://www.ptltd.com/platform/acpi.html, Nov. 11, 1999, 8 pages.

*Techniques for Mobile Implementation of ACPI*, Intel®, Sep. 1998, 8 pages.

*Why Do I Need a 16550/16650?*, http://www.byterunner.com/why.html, Jan. 29, 1999, pp. 1 and 2, pp. 1 through 9.

*Extended AT Command Sets*, © 1995 modems.com; http://www.modems.com/general/extendat.html; Nov. 4, 1999, 24 pages.

*Advanced Configuration and Power Interface Specification*, Rev. 1.0, © Intel®, Microsoft®, Toshiba®, pp. i, ii, 1–1 through 1–7, and 5–75 through 5–108.

*Advanced Configuration and Power Interface Specification*, Intel/Microsoft/Toshiba Revision 1.0, Dec. 22, 1996, 2 cover pages, pp. 1–1 through 1–7, pp. 5–75 though 5–108.

Intel Corporation et al., "PC98 System Design Guide, A Technical Reference for Designing PCs and Peripherals for the Microsoft Windows Family of Operating Systems," cover page, pp. ii–viii, x, 17, 371–385 (1997).

* cited by examiner

Primary Examiner—Jeffrey Gaffin
Assistant Examiner—Harold Kim
(74) Attorney, Agent, or Firm—Akin Gump Strauss Hauer & Feld LLP

(57) ABSTRACT

A computing system employs an unicode driver to access and control peripheral devices by abstracting commands and status data to a level above register sets of similar but potentially incompatible peripheral devices. A unicode may be generated by an operating system or the unicode driver. Unicodes are routed by a device configuration interface that passes the unicodes between the unicode driver and peripheral devices. The peripheral devices include command decoders for performing conversion between unicodes and device-specific instructions. The use of unicode drivers eliminates duplicate driver code and simplifies device configuration for the computing system.

17 Claims, 8 Drawing Sheets

UNICODE-BASED DRIVERS, DEVICE CONFIGURATION INTERFACE AND METHODOLOGY FOR CONFIGURING SIMILAR BUT POTENTIALLY INCOMPATIBLE PERIPHERAL DEVICES

BACKGROUND OF THE INVENTION

1. Field of the Invention

The present invention generally relates to a method of and apparatus for interfacing peripheral devices to different computing system hardware implementations and, more particularly, to an apparatus that enables peripheral devices to work on a variety of computing system hardware platforms using standard software drivers by abstracting register sets of similar but potentially incompatible peripheral devices to a common register set.

2. Description of the Related Art

Communication between a computing system and a peripheral device has long required compatibility between a software driver and the register set of the peripheral device. To support peripheral devices, a computing system has provided multiple software drivers to ensure that each device register set is matched to a compatible software driver. Certain peripheral devices, which are similar in setup parameter requirements, have incompatible register interfaces so as to require different software drivers. Since even related peripheral devices commonly have incompatible register sets, providing a single software driver has not been an option for computing systems supporting multiple peripheral devices. Likewise, a standard input/output interface between software drivers and peripheral devices has not been possible due to register set compatibility requirements. Because of register set compatibility concerns, adding a new peripheral device to a computing system has typically required adding a new software driver, even though the new software driver likely duplicates some of the code found in the supported software drivers. Computing systems have been unable to leverage their supported software drivers to provide driver support for similar but potentially incompatible peripheral devices.

SUMMARY OF THE INVENTION

Briefly, in accordance with the present invention, an operating system running on a computing system employs a unicode driver to access and control peripheral devices. For the purposes of the present invention, a unicode is an abstraction of typical commands and status messages that are employed by similar but potentially incompatible peripheral devices. A unicode driver, an abstraction of multiple device drivers, generates command unicodes to and interprets status unicodes from the peripheral devices. The method and apparatus according to the present invention enable an operating system to communicate with multiple peripheral devices by use of a standardized input/output interface. Many device drivers contain duplicate code because a portion of their functions are identical. The duplication of driver code is even more pronounced among peripheral devices of a similar type. The method and apparatus according to the present invention abstract similar but potentially incompatible peripheral devices into "device classes" and enable the creation of unicode drivers that eliminate duplicate driver code and simplify the configuration of a computing system. This removes the need for a separate device driver for each peripheral device in a computing system, thus reducing programming effort. New peripheral devices of a similar device type can be added to a computing system without adding device drivers and, as is necessary in some operating systems such as UNIX, without rebuilding the operating system.

The unicode driver or the operating system generates a command unicode for transmission to a peripheral device. The command unicode is passed by the unicode driver to a device configuration interface. The device configuration interface determines the appropriate target peripheral device for the command unicode and routes the command unicode to a command decoder within the target peripheral device. The selected command decoder then maps the data of the command unicode stored in master registers to the appropriate registers of the target peripheral device. The command decoder basically converts the command unicode to a device-specific instruction that the target peripheral device can process. Device-specific status information from the target peripheral device is converted into a status unicode, preferably an understandable ASCII text string, by the command decoder and is transmitted to the unicode driver or operating system either directly or through the device configuration interface.

New peripheral devices for a computing system that are similar to supported peripheral devices can be supported by sending a human-readable ASCII text string to the device configuration interface through a configuration port. The ASCII text string represents configuration parameters of the new device and is written to the configuration port and interpreted by the configuration decoder of the device configuration interface. The configuration decoder maps the ASCII text string to a device class, determines whether the device class corresponds to a new or existing unicode driver and updates the device configuration interface so that the unicodes are routed to the appropriate device. If necessary, a new unicode driver is loaded into the computing system prior to updating the device configuration interface.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF PREFERRED EMBODIMENT

Figure 1:
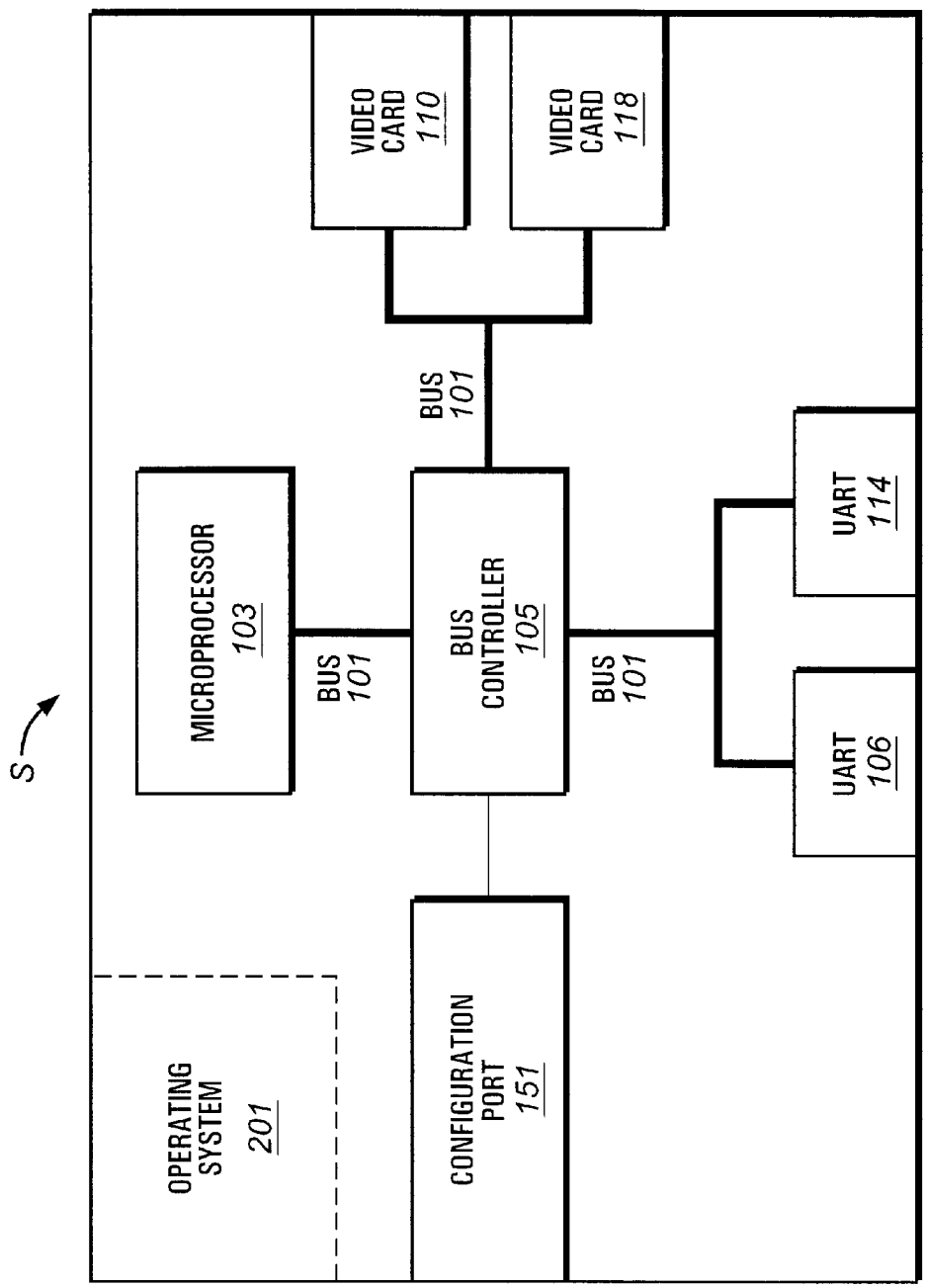
FIG. 1 is a block diagram of a computing system coupled to two universal asynchronous receiver transmitters (UARTs) and two video cards in accordance with the present invention.
Figure 3:
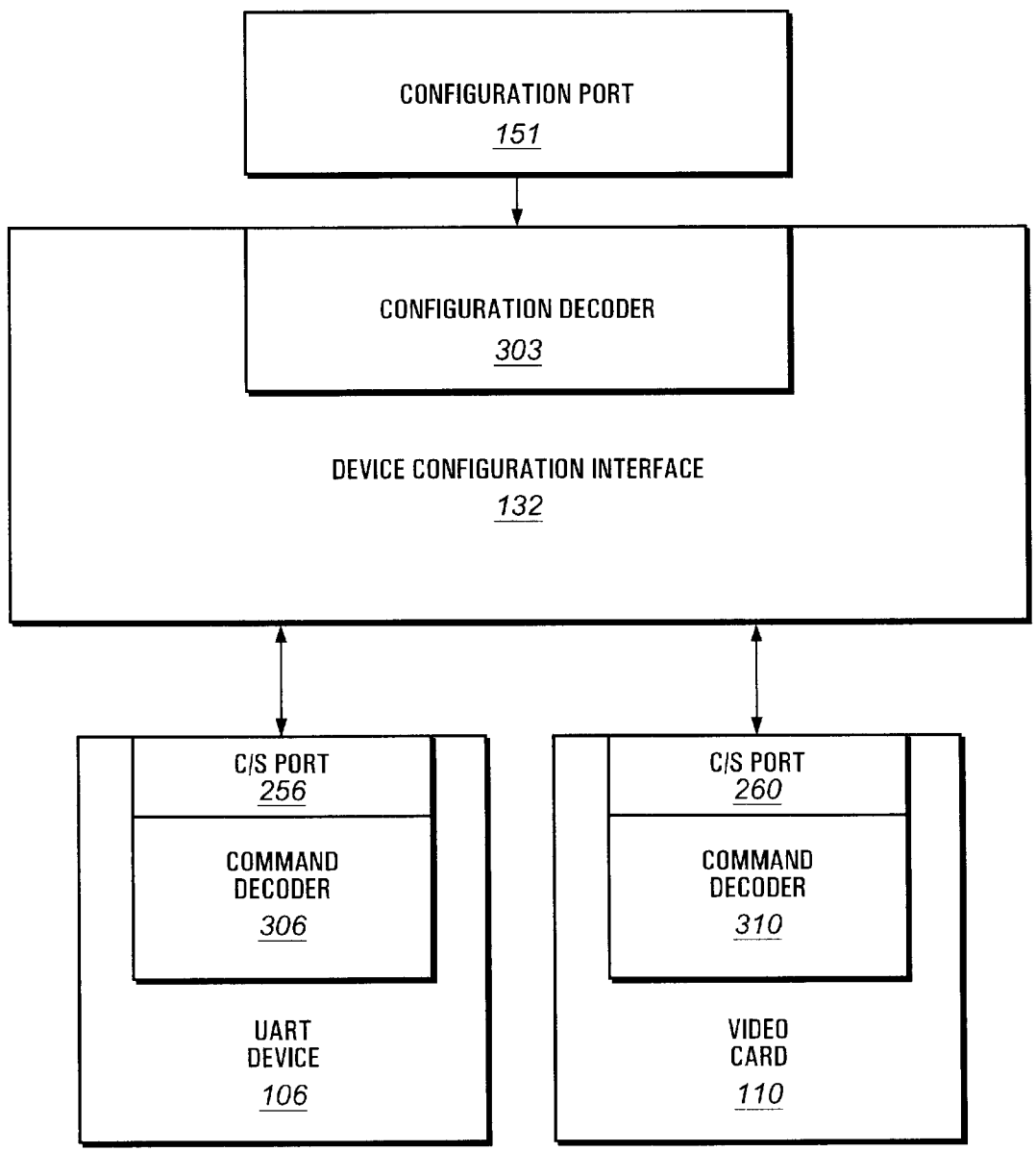
FIG. 3 is a block diagram of the device configuration interface and configuration port according to the present invention.

Turning now to the drawings, FIG. 1 illustrates a block diagram of an exemplary architecture for a computing system S implemented in accordance with the present invention. The computing system includes a microprocessor 103 coupled to a bus controller 105 by means of a bus 101. In the preferred embodiment, the bus 101 is a peripheral component interconnect (PCI) bus although it may be an integrated drive electronics (IDE) interface or extended industry standard architecture (EISA) bus. The precise implementation of the bus 101 is not critical to the present invention. Coupled to the bus controller 105 by means of the bus 101 are four internal peripheral devices, a universal asynchronous receiver transmitter (UART) device 106, a UART device 114, a video card 110 and a video card 118. The UART devices 106 and 114 and the video cards 110 and 118 are exemplary of peripheral devices that may be attached to the computing system S. Although the UART devices 106 and 114 and the video cards 110 and 118 are all internal, the method and apparatus according to the present invention is applicable to a wide variety of peripheral devices, both internal and external, such as floppy disks, printers, scanners and CD-ROM drives The bus controller 105 contains circuitry to connect a configuration port 151 implemented according to the present invention. The configuration port 151 is described in more detail below (FIG. 3). The microprocessor 103 in the disclosed embodiment is compatible with the Am 186 instruction set implemented in a variety of microprocessors from Advanced Micro Devices, Inc. of Sunnyvale, Calif. A variety of other microprocessors could be used instead of the processor 103. Finally, the computing system S includes an operating system 201, typically run on the microprocessor 103.

A variety of configurations and combinations of peripheral devices for the computing system S are possible. It should be understood that the disclosed peripheral devices are illustrative and not exhaustive. A number of the illustrated peripheral devices could be eliminated, or added to, without detracting from the spirit of the invention.

Figure 2:
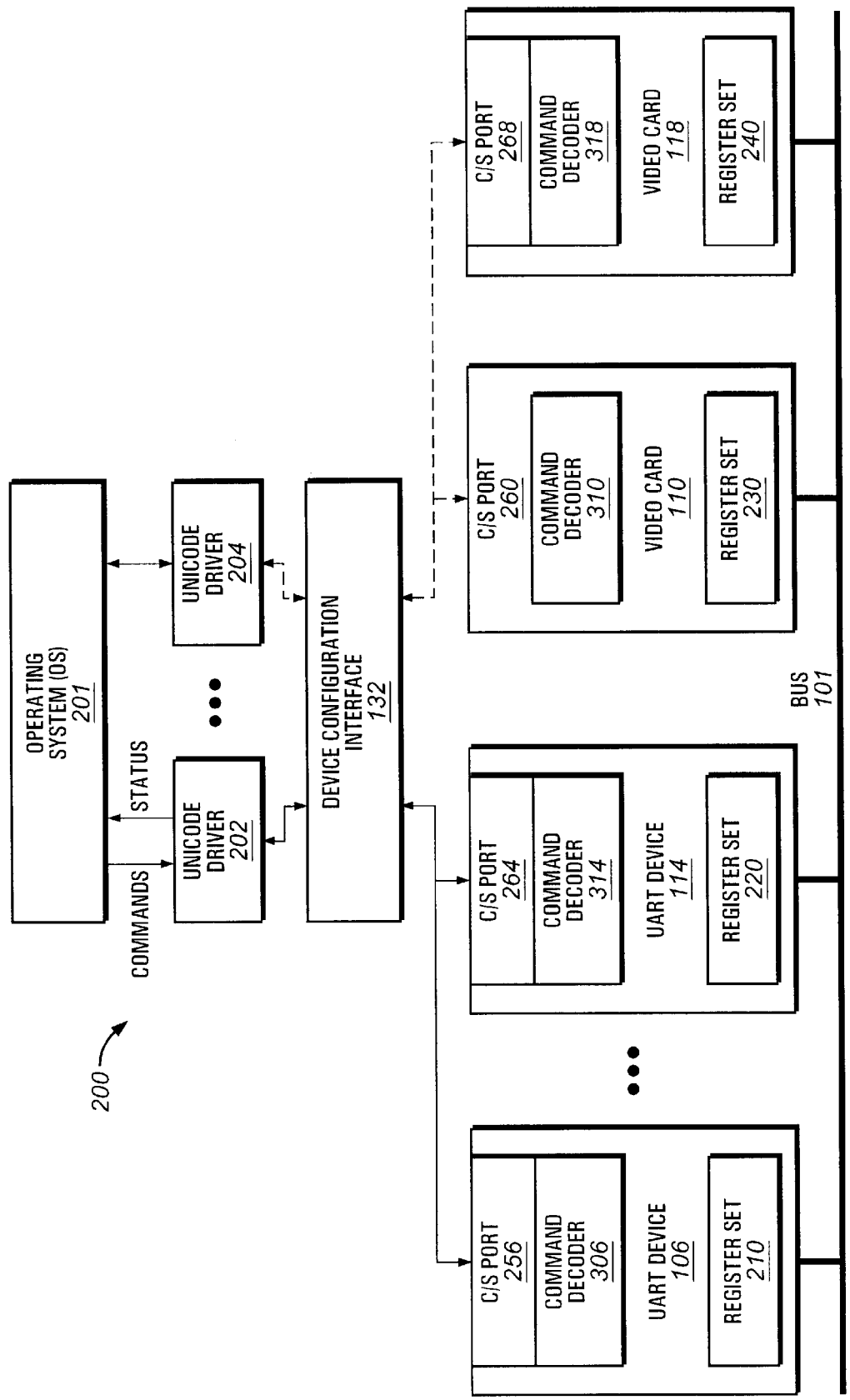
FIG. 2 is a block diagram showing an exemplary relationship between an operating system (OS), unicode drivers, a device configuration interface and multiple peripheral devices according to the present invention.

Turning now to FIG. 2, illustrated is a block diagram of a typical system configuration according to the methodology and apparatus of the present invention. The system configuration (200), which runs on the computing system S, includes the computer operating system (OS) 201, unicode drivers 202 and 204, a device configuration interface 132, the UART devices 106 and 114 and the video cards 110 and 118. In a typical computing system, the operating system 201 would be interfaced with a separate "device driver" (the software necessary to access and control a particular peripheral device) for each peripheral device installed on the system. In accordance with the present invention, use of the unicode drivers 202 and 204 and the device configuration interface 132 eliminates duplicate driver code, thus simplifying peripheral device configuration for a computing system.

In this example, the OS 201 accesses and controls multiple UART devices 106 and 114 through the one unicode driver 202. Each UART device 106 and 114 includes a set of registers 210 and 220, a command/status (C/S) port 256 and 264 and a command decoder 306 and 314 respectively. The register sets 210 and 220 control the UART devices 106 and 114 and provide storage space so that the unicode driver 202 can write device-specific instructions to and read device-specific status messages from each device. The device configuration interface 132 receives a command unicode from the unicode driver 202 and determines whether the command unicode is directed to the UART device 106, the UART device 114, the video card 110 or the video card 118. In the case of a command directed to the UART device 106, the command decoder 306 receives the command unicode from the device configuration interface 132 by means of the C/S port 256 and converts the command unicode into instructions and data that the UART device 106 can process.

Although the two different UART devices 106 and 114 may have similar functionality, the register sets 210 and 220 are potentially incompatible. The configuration interface 132, which determines the target device, and the command decoders 306 and 314, which resolve the differences between an abstracted register set and the register sets 210 and 220, enable both UART devices 106 and 114 to be accessed and controlled by the OS 201 through the one unicode driver 202. Together, the device configuration interface 132 and the command decoders 306 and 314 eliminate any need for separate device drivers for each UART device 106 and 114.

The video cards 110 and 118 include a C/S port 260 and 268 and potentially incompatible register sets 230 and 240 respectively. In a fashion similar to the UART devices 106 and 114, the OS 201 accesses and controls the video cards 110 and 118 by way of a single unicode driver 204 and the device configuration interface 132. In addition, there may be more unicode drivers than the two illustrated unicode drivers 202 and 204 to control additional types of devices. Typically, there would be one unicode driver for each class or type of peripheral device coupled to the computing system S. The specific number of video cards and UARTS as well as the particular types of devices in this example may be more or less without detracting from the spirit of the invention. Although, FIG. 2 illustrates the bus 101 connected to the devices 106, 114, 110 and 118 independently from the C/S ports 256, 264, 260 and 268, the devices 106, 114, 110 and 118 may be configured so that the bus 101 is wired through the C/S ports 256, 264, 260 and 268.

Turning now to FIG. 3, illustrated is the device configuration interface 132 including a configuration decoder 303. Also illustrated are the configuration port 151, the UART device 106 and the video card 110. The configuration decoder 303 is coupled to the configuration port 151. The configuration port 151 receives a preferably human-readable ASCII text string, or unicode setup string, from a new peripheral device that is to be configured. For example, if a new serial port is added to the computing system S, a unicode setup string "COM1,1200,N,8,1,IRQ4" can be written to the configuration port 151. This indicates that the new peripheral device's desired setup is on a COM_1 port, at a data rate of 1200 bits per second, with no parity, 8 bits per word each word containing 1 stop bit and employs interrupt request 4. The device configuration interface 132 determines whether the unicode text string represents existing unicodes and, if not, converts the unicode text string into new unicodes. The device configuration interface 132 then correlates the new or existing unicodes both to the new serial port and a new or existing unicode driver.

Another example is a second unicode setup string "320, 480,4,S,100,3D4" that indicates that a new liquid crystal display (LCD) controller is being added with a vertical resolution of 320 pixels, a horizontal resolution of 480 pixels, 4 bits of data per pixel, single scan panel mode and a refresh rate of 100 frames per second. The term "3D4" in the second unicode setup string represents the base address of the LCD controller and may be used for direct mapped status and command purposes. It should be understood that the described embodiment does not necessarily replace direct mapped I/O for purposes of status and command purposes but rather may co-exist with conventional techniques and systems.

The configuration decoder 303 interprets the second unicode setup string and determines, depending upon the new LCD controller's device class, whether the unicode text string represents a new command decoder or one of the existing command decoders 310 or 318. The command decoders 310 and 318 each decode standardized unicodes for a particular type of device. For example, the command decoder 306 may represent the command decoder for a particular UART device and thus be the target of unicodes correlated by the configuration decoder 303 to the first unicode setup string "COM1,1200,N,8,1,IRQ4." The command decoder 310, for example, may represent the command decoder the LCD controller and thus be the target of unicodes correlated by the configuration decoder 303 to the second unicode setup string "320,480,4,S,100,3D4." In addition to determining which unicodes and command decoder 306 or 310 that the unicode setup string correlates to, the configuration decoder 303 also correlates the corresponding unicodes to a particular unicode driver, in this case either unicode driver 202 or 204 (FIG. 2). Only one set of unicodes is required for different devices within a general class of devices because the common functionality of individual devices within a particular class has been abstracted within the device itself.

In addition to device specific commands and status, there can be a set of unicodes that are applicable for multiple device classes. For example, commands such as "Go To Sleep," "Reset," "Wake Up" and "perform Self-test" may be common to a large number of device classes and each have a single unicode, recognizable to the large number of classes. Likewise, status messages such as "Command Complete" and "Power On" may be common to the large number of device classes and each have a single unicode representation.

Figure 4:
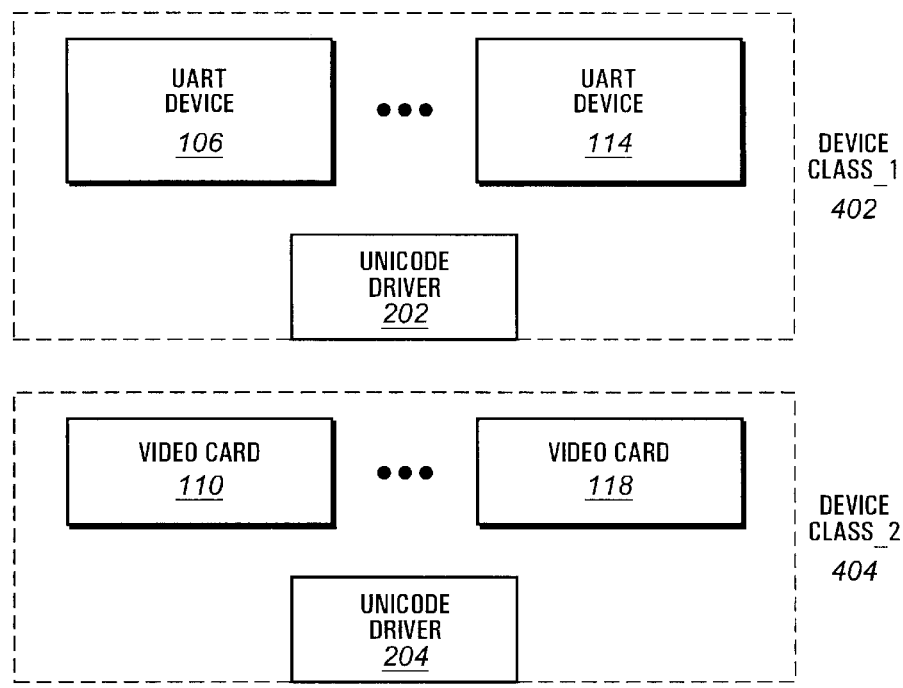
FIG. 4 is a block diagram showing multiple UARTs and video cards grouped by their respective device classes in accordance with the present invention.

Turning now to FIG. 4, illustrated is a relationship between two device classes, a device class_1 402 and a device class_2 404, and the two unicode drivers 202 and 204. The device class_1 402 is an abstraction of the similar but potentially incompatible UART devices, including the UART device 106 and the UART device 114. For example, the UART device 106 may be a PC/AT compatible 16550 UART device and the UART device 114 may be a 186 type UART device. The single unicode driver 202 issues commands and receives status from both UART devices 106 and 114.

The video card 110 may be a Viper V550 card manufactured by Diamond Multimedia Corporation of San Jose, Calif. and the video card 118 may be a CL-GD546X manufactured by Cirrus Logic Corporation of Fremont, Calif. The device class_2 404 is an abstraction of the similar but potentially register set incompatible video cards, sharing the single unicode driver 204.

Figure 5:
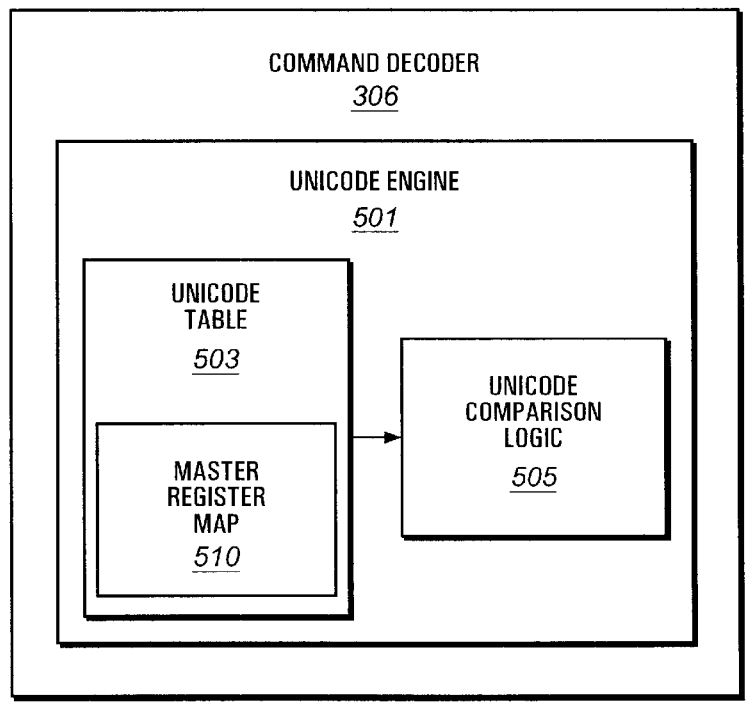
FIG. 5 is a block diagram of an exemplary command decoder of FIG. 3 according to the present invention.

Turning now to FIG. 5, illustrated is the command decoder 306 for the device class_1 402 including a unicode engine 501. The unicode engine 501 contains logic to generate device-specific instructions to UART devices 106 and 114 and interpret data such as device-specific status messages from UART devices 106 and 114. The unicode engine 501 includes an unicode table 503 and unicode comparison logic 505. The unicode table 503 contains a number of unicodes that may be interpreted by the command decoder 306. The unicode comparison logic 505 ensures that the data routed to the command decoder 306 contains a unicode that is located within the unicode table 503 and is thus capable of being interpreted by the command decoder 306. If data received by the command decoder 306 is rejected by the unicode comparison logic 505, the command decoder 306 returns an error status to the peripheral device which was the source of the data. Included in the unicode table 503 is a master register map 510 that enables the unicode engine 501 to map a set of registers of a particular device to an abstract set of registers shared by all devices in the device class. For example, the OS 201 can issue a unicode read command directed to the UART device 106. The command decoder 306 determines that the unicode read command is directed to the UART device 106 and converts the unicode read command into a device-specific instruction that accounts for the particular register set 210 (FIG. 2) of the UART card 106. Generating the device-specific instruction can be a matter of reordering data embodied in the unicode read command. Thus, in accordance with the present invention, the OS 201 is relieved from maintaining a different device driver for each peripheral device.

Figure 6:
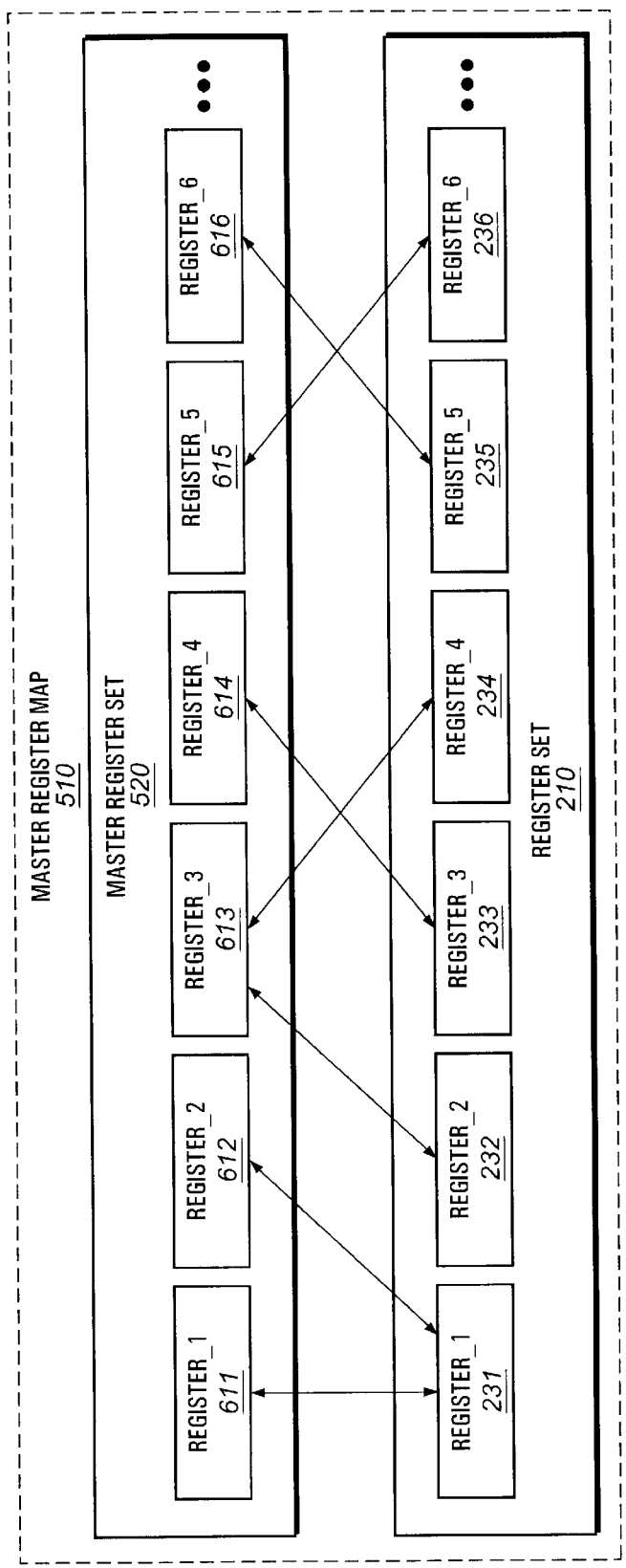
FIG. 6 is a block diagram illustrating an exemplary relationship between register sets of a UART device and master register sets of a command decoder according to the present invention.

Turning now to FIG. 6, illustrated is the master register map 510 of the command decoder 306 and an exemplary mapping between a master register set 520 and the register set 210 of the UART device 106. The register set 210 of the UART device 106 includes a register_1 231, a register_2 232, a register_3 233, a register_4 234, a regester_5 235 and a register_6 236. The master register set 520 of the command decoder 302 includes a register_1 611, a register_2 612, a register_3 613, a register_4 614, a register_5 615 and a register_6 616. There may be less or additional registers in both register sets 520 and 210, but for simplicity six registers in each are shown. The illustrated mapping relationship of the registers represents one of a number of possibilities. Depending on a particular peripheral device's architecture, the mapping relationship between the master register set 520 and the register set of the particular device is bi-directional with any possible combination of one-to-one, one-to-many, many-to-one and many-to-many register mappings.

The register_1 611 of register set 520 maps to the register_1 231 of register set 210. With respect to the UART device 106, the register_1 231 is either a Receive Holding register or a Transmit Holding register depending on whether the UART device 106 is in a read or write mode respectively. In the master register set 520, separate registers are employed, register_1 611 for the read mode and register_2 612 for the write mode. Typically, contents of a data bus are written to the register_611 and then mapped to the register_1 231 when a holding register empty flag of a Line Status register in the UART device 106 is set (not shown).

The register_3 613 of the master register set 520 can be a two-byte register that corresponds to both the least significant byte (LSB) Divisor Latch register, represented by register_2 232, and the most significant byte (MSB) Divisor Latch register, represented by register_4 234. The register_4 614 may correspond to an Interrupt Enable register, represented in this example by register_3 233. Register_6 626 may correspond to an Interrupt Status register, represented in this example by register_5 235.

Finally, a register_5 625 may correspond to a Line Control register, represented by register_6 236, an eight-bit register. A typical 16550 UART employs the Line Control register 236 to specify an asynchronous data communication format. Bits 0 and 1 specify the received according to the values in the following table:

| Bit 1 | Bit 0 | Word Length |
|---|---|---|
| 0 | 0 | 5 |
| 0 | 1 | 6 |
| 1 | 0 | 7 |
| 1 | 1 | 8 |

The value of bit 2 of the Line Control register 236 indicates the number of stop bits according of the following table:

| Bit 2 | Word Length | Stop Bit(s) |
|---|---|---|
| 0 | 5, 6, 7, 8 | 1 |
| 1 | 5 | 1.5 |
| 1 | 6, 7, 8 | 2 |

The value of bit 3 of the Line Control register 236 indicates whether the data format has parity ("1") or no parity ("0"). If the value of bit 3 of the Line Control register 236 indicates that the data formate has parity, then the value in bit 4 indicates whether the parity is even ("1") or odd ("0"). If the value of bit 5 of the Control Status register 236 is "1," then the parity is forced to "0" if the value of bit 4 is "1" and forced to "1" if the value in bit 4 is "0." If the value of bit 6 of the Line Control register 236 is "1," then a break condition is transmitted. If the value of bit 7 of the Line Control register 236 is "1." then a baud latch is enabled.

In the example of the unicode setup string "COM1,1200, N,8,1,IRQ4" discussed before, the values of bits 0 and 1 are both "1" indicating that the length of a word is 8. The value of bit 2 is "0" indicating that there is 1 stop bit. The value of bit 3 is "0" indicating that no-parity is selected. The command decoder 306 (FIG. 3) converts values in the register_5 615 to the values above and writes them to register_6 236 so that the UART device 106 can interpret them properly.

In a similar manner, status information that is received from the UART device 106 is mapped from the register set 210 to the master register set 520 and converted into a unicode formate for transmission by the device configuration interface 132 to the operating system 201 or possibly another UART card or other peripheral device.

Figure 7:
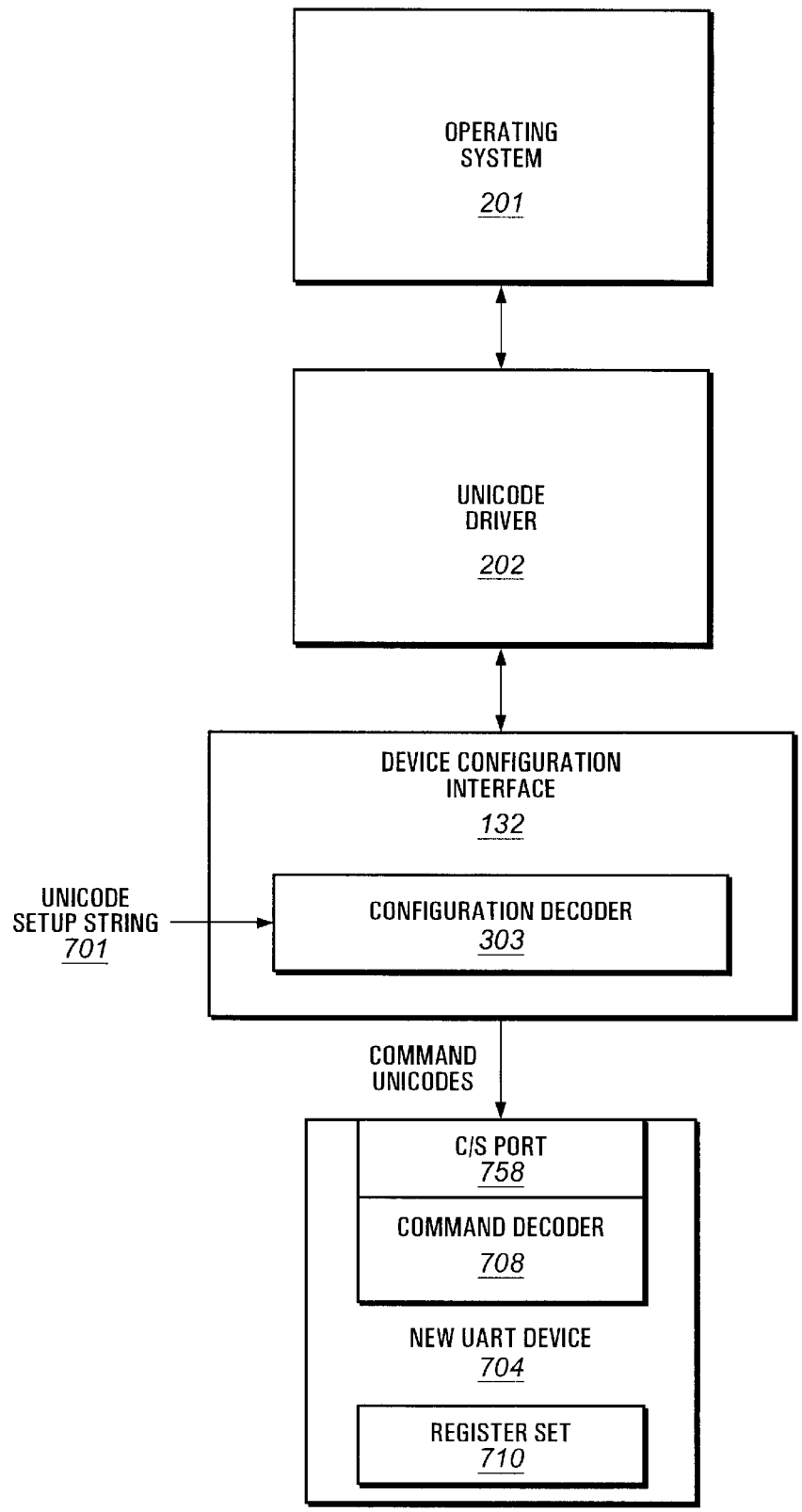
FIG. 7 is a block diagram illustrating the addition of new unicodes for an exemplary new UART device in accordance with the present invention.

Turning now to FIG. 7, illustrated is the addition of new unicodes for a new UART device 704 by means of a unicode setup string 701. The unicode setup string 701, in this example the string "COM2,1200,N,8,1,IRQ5," is written to the configuration port 151 coupled to the configuration decoder 303 of the device configuration interface 132. The configuration decoder 303 translates the unicode setup string 701 into unicodes and the device configuration interface 132 correlates the unicodes to the appropriate peripheral device, in this example the new UART device 704 and the appropriate unicode driver, in this case the unicode driver 202. A command decoder 708 receives unicodes through a C/S port 758 and maps the master register set 520 of device class represented by unicode driver 202 to the register set 710 of the new UART device 704. Finally, the configuration decoder 303 uses the interrupt specified in the unicode setup string 701, "IRQ5," as an identifier to the new UART device 704.

Figure 8:
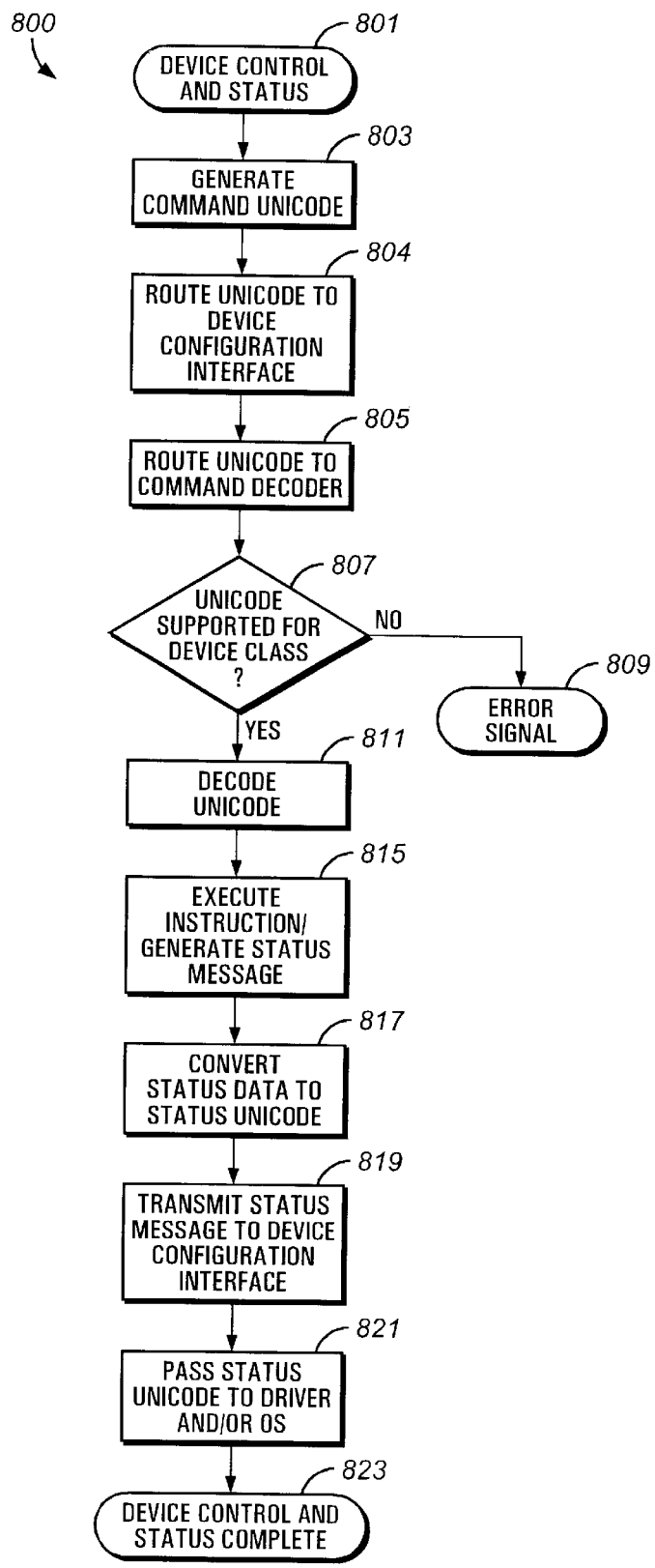
FIG. 8 is a flowchart of peripheral device control in accordance with the present invention.

Turning now to FIG. 8, illustrated is a flowchart of a process 800 that runs on the processor 103 and implements according to the present invention a device control and status process directed, in this example, to the video card 118, but applicable to any peripheral device. Beginning in step 801, control immediately proceeds to step 803 where a command unicode is generated, typically by either the unicode driver 204 or the OS 201, for a device that is being controlled, the video card 118 in this example. Control then proceeds to step 804 where the command unicode is routed to the device configuration interface 132 which determines the appropriate peripheral device and, in step 805, routes the command unicode to the command decoder 318 for the video card 118. Control then proceeds to step 807 where it is determined whether the command unicode is supported for the device class 404 of the video card 118. If the command unicode is not supported, then the process finishes at step 809 where an error code is generated; otherwise, if the command unicode is supported, then control proceeds to step 811 where the command unicode is decoded by the command decoder 308.

The decoding of the command unicode in step 811 involves the mapping of the command unicode into the register set 240 of the video card 118. Next, in step 815, the video card 118 then processes the device-specific instruction represented by the mapped data in the register set 240. As a result of the processing of the device-specific instruction, the video card 118 can generate a device-specific status message. Next, in step 817, the device-specific status message is transmitted by the video card 118 to the command decoder 308 of the video card 118 and the device-specific status message is then interpreted and converted into a status unicode in step 817. Next, in step 819, the status unicode is routed to the device configuration interface 132. Control then proceeds to step 821 where the status unicode is passed to the initiator of the process 800, typically either the unicode driver 204 or the OS 201, or to both the unicode driver 204 and the OS 201. The unicode driver 204 and/or the OS 201 process the status unicode according to their own requirements. For example, the OS 201 might output a user message indicating the receipt of the status unicode. Finally, process 800 concludes in step 823 with the device control and status complete.

It is not critical to the present invention that a command unicode be followed by a device-specific status message or that a device-specific status message be preceded by a command unicode. There can be command unicodes that do not cause a peripheral device to generate a device-specific status message, and there can be status-specific messages that are generated without a corresponding command unicode. As can be seen from FIG. 8, the processing is similar with respect to the portions of the process 800 that describe command unicode generation and processing and device-specific status message generation and processing respectively.

Figure 9:
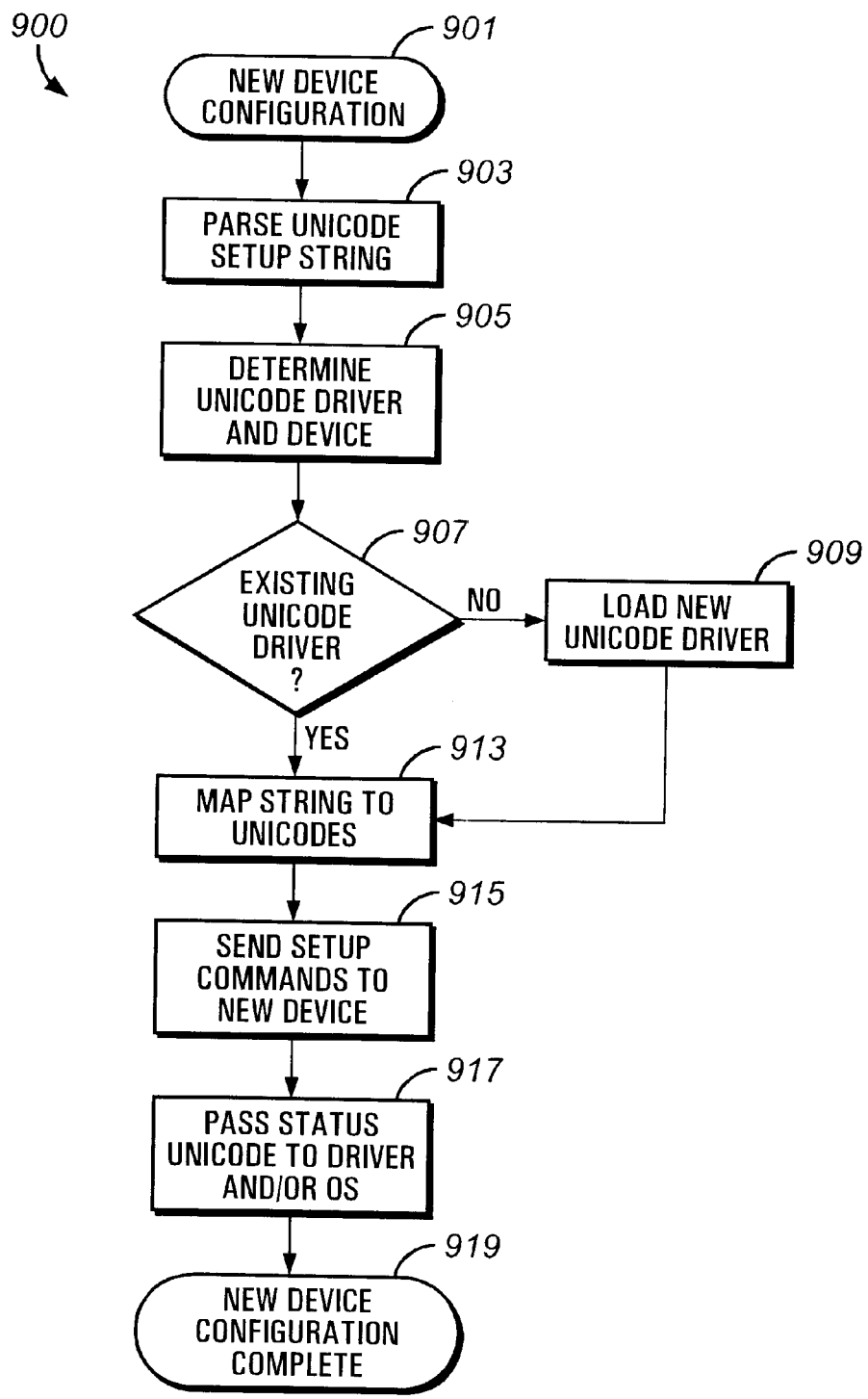
FIG. 9 is a flowchart of addition of new unicodes in accordance with the present invention.

Turning now to FIG. 9, illustrated is a flowchart of a process 900 that runs on the processor 103 and implements the addition of a new peripheral device and the unicodes that control and report the status of the new device according to the present invention. Beginning in step 901, control immediately proceeds to step 903 where a unicode setup string 701 is read through the configuration port 151 (FIG. 3) into the configuration decoder 303. Control then proceeds to step 905 where the configuration decoder 303 parses the unicode setup string and then determines, in step 905, a device class 402 or 404 that the new device 704 belongs to. Then in step 907, the process 900 determines whether a unicode driver corresponding to the device class of the new device 704 is already loaded on the computing system S. If the answer in step 907 is YES, control proceeds to step 913. If the answer in step 907 is NO, then control proceeds to step 909 where a new unicode driver is loaded into the computing system S. In one embodiment, the new unicode driver is loaded through the configuration port 151. It is not critical to the invention how the new unicode driver is loaded; it may be read from a floppy disk or hard drive (not shown) for example. Once the new unicode driver is loaded in step 909, control then proceeds to step 913.

Next, in step 913, the configuration decoder 303 of the device configuration interface 132 maps the appropriate unicodes to the new device 704 and, if necessary, transmits command unicodes to the command decoder 308 of the new device 704 to initiate setup procedures. The new device 704 may respond with status unicodes indicating whether or not the setup has completed successfully. The device configuration interface 132 may then pass a status unicode to the unicode driver for the new peripheral device 704 in step 917. Finally, processing finishes in step 919 where new device configuration is complete.

The foregoing disclosure and description of the preferred embodiment are illustrative and explanatory thereof, and various changes in the methodology, apparatus, variables, number of parameters, order of steps, field sizes, data types, code elements, code size, connections, components, and circuitry, as well as in the details of the illustrated hardware and software and construction and method of operation may be made without departing from the spirit of the invention.

We claim:

1. A computing system, comprising:

a processor;

an operating system for execution by the processor;

a plurality of unicode device drivers, coupled to the operating system, each of the plurality of unicode device drivers adapted for hardware-independent control of a class of peripheral devices using a unicode command string;

a unicode device configuration interface, coupled to the operating system and the plurality of unicode device drivers, comprising:

a configuration decoder, comprising executable code to perform the steps of:

receiving a unicode configuration string for a peripheral device;

correlating the unicode configuration string to a first unicode device driver of the plurality of unicode device drivers; and configuring the operating system to communicate with the peripheral device via the first unicode device driver;

wherein the unicode configuration string is a text string of characters.

2. The computing system of claim 1, the unicode device configuration interface further comprising:

a unicode configuration port, wherein the unicode configuration string is received on the unicode configuration port.

3. The computing system of claim 1, the unicode device configuration interface further comprising:

a peripheral device, for coupling to the processor, comprising:

a unicode command decoder, adapted to perform the steps of:

sending the unicode configuration string to the unicode device configuration interface;

translating the unicode command string into device-specific commands; and executing the device specific commands to control the peripheral device, wherein the unicode command string is a text string of characters.

4. The computing system of claim 3, wherein the peripheral device is adapted to receive and execute both the unicode command string and the device specific commands.

5. A unicode device configuration interface for an operating system of a computing system, comprising:

a configuration decoder, comprising executable code to perform the steps of:

receiving a unicode configuration string for a peripheral device;

correlating the unicode configuration string to a unicode device driver of a plurality of unicode device drivers; and configuring the operating system to communicate with the peripheral device via the unicode device driver; and a unicode command router adapted to route a unicode command string from the operating system to the unicode device driver;

wherein the unicode configuration string is a text string of characters, and wherein the unicode command string is a text string of characters.

6. The unicode device configuration interface of claim 5, the step of configuring the operating system to communicate with the peripheral device via the unicode device driver comprising the steps of:

determining whether the unicode device driver is currently loaded on the computing system; and loading the unicode device driver on the computing system if the unicode device driver is not currently loaded on the computing system.

7. The unicode device configuration interface of claim 5, further comprising:

a unicode configuration port, the step of loading the unicode device driver on the computing system comprising the step of:

loading the unicode device driver via the unicode configuration port.

8. A peripheral device, for coupling to a computing system, comprising:

a unicode command decoder, adapted to perform the steps of:

sending a device-independent format unicode configuration string to a unicode device configuration interface of an operating system executing on the computing system;

translating a device-independent unicode command string from the computing system into device-specific commands; and executing the device-specific commands to control the peripheral device, wherein the device-independent unicode configuration string is a text string of characters, and wherein the device-independent unicode command string is a text string of characters.

9. The peripheral device of claim 8, the unicode command decoder further adapted to perform the steps of:

generating a device-dependent status message by the peripheral device;

converting the device-dependent status message into a device-independent status message; and sending the device-independent status message to a device configuration interface of the operating system, wherein the device-independent status message is a text string of characters.

10. The peripheral device of claim 8, wherein the device-dependent status message is generated responsive to the device-independent unicode command string.

11. The peripheral device of claim 8, wherein the device-dependent status message is generated responsive to a device-specific command from the computing system.

12. A method of configuring an operating system for communication with a peripheral device, comprising the steps of:

receiving a device-independent unicode configuration string by a unicode configuration interface of the operating system from the peripheral device;

decoding the device-independent unicode configuration string;

selecting a device-independent unicode device driver by the unicode configuration interface for use with the peripheral device, the device-independent unicode device driver adapted to communicate with a plurality of disparate peripheral devices; and routing a device-independent unicode command string from the operating system to the device-independent unicode device driver selected by the unicode configuration interface, wherein the device-independent unicode configuration string is a text string of characters, and wherein the device-independent unicode command string is a text string of characters.

13. The method of claim 12, further comprising:

receiving a device-independent unicode command string from the device-independent unicode driver; and executing device-dependent commands responsive to the device-independent unicode command string.

14. A method of configuring an operating system for communication with a peripheral device, comprising the step of:

generating a device-independent unicode configuration string by the peripheral device, the device-independent unicode configuration string identifying characteristics of the peripheral device, and coupling the peripheral device to a device-independent unicode driver of the operating system responsive to the device-independent unicode configuration string, wherein the device-independent unicode configuration string is a text string of characters.

15. The method of claim 14, further comprising:

generating a device-dependent status message by the peripheral device;

converting the device-dependent status message into a device-independent status message;

sending the device-independent status message to a device configuration interface of the operating system;

routing the device-independent status message from the device-configuration interface to the device-independent unicode device driver; and processing the device-independent status message by the unicode device driver.

16. The method of claim 14, wherein the generating step is performed by the peripheral device upon coupling of the peripheral device to the operating system.

17. The method of claim 14, further comprising:

receiving a device-independent unicode command string from the device-independent unicode driver; and executing device-dependent commands responsive to the device-independent unicode command string, wherein the device-independent unicode command string is a text string of characters.

\* \* \* \* \*